(12) United States Patent
Uemura

(10) Patent No.: US 10,686,995 B2
(45) Date of Patent: Jun. 16, 2020

(54) LIGHT IRRADIATION APPARATUS, OPTICAL EVALUATION APPARATUS, AND ARTICLE MANUFACTURING METHOD

(71) Applicant: CANON KABUSHIKI KAISHA, Tokyo (JP)

(72) Inventor: Takanori Uemura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/454,542

(22) Filed: Jun. 27, 2019

(65) Prior Publication Data

US 2020/0014835 A1 Jan. 9, 2020

(30) Foreign Application Priority Data

Jul. 3, 2018 (JP) .................. 2018-126888

(51) Int. Cl.

| G01N 21/93 | (2006.01) |
|---|---|
| G01B 11/00 | (2006.01) |
| G02B 26/10 | (2006.01) |
| G06T 3/00 | (2006.01) |
| G06T 5/00 | (2006.01) |
| H04N 5/235 | (2006.01) |
| G01N 21/88 | (2006.01) |

(52) U.S. Cl.
CPC ....... *H04N 5/2352* (2013.01); *G01N 21/8851* (2013.01); *G01N 2201/06166* (2013.01)

(58) Field of Classification Search
CPC ............. H04N 5/2352; G01N 21/8851; G01N 2201/06166
See application file for complete search history.

(56) References Cited

U.S. PATENT DOCUMENTS

| 2004/0209410 A1* | 10/2004 | Tanaka | ............... B23K 26/08 438/166 |
|---|---|---|---|
| 2014/0009729 A1* | 1/2014 | Otaki | ............... B23K 26/0613 349/106 |

FOREIGN PATENT DOCUMENTS

JP          5994419 B2     9/2016

\* cited by examiner

*Primary Examiner* — Thai Q Tran
*Assistant Examiner* — Jose M Mesa
(74) *Attorney, Agent, or Firm* — Rossi, Kimms & McDowell LLP

(57) ABSTRACT

A light irradiation apparatus for irradiating an object with light, includes a plurality of line-shaped light blockers arranged at a predetermined center-to-center interval, and configured to at least partially block light, and a plurality of line-shaped light irradiators arranged to overlap some of the plurality of light blockers so as to irradiate the object with light. The plurality of light irradiators are arranged to form a period not less than twice as large as the center-to-center interval of the plurality of light blockers.

14 Claims, 5 Drawing Sheets

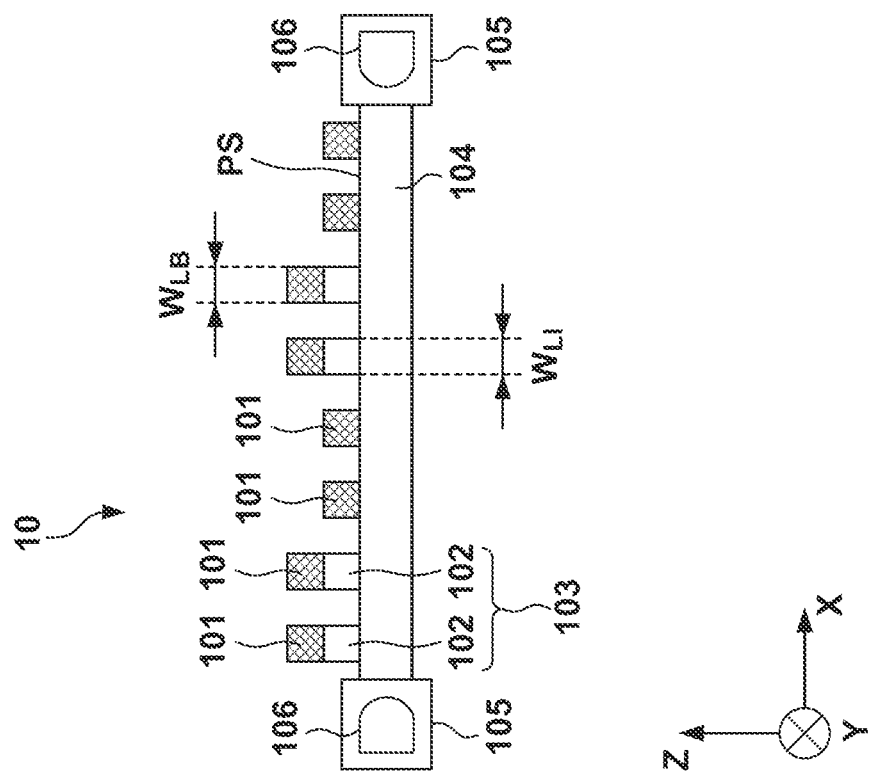
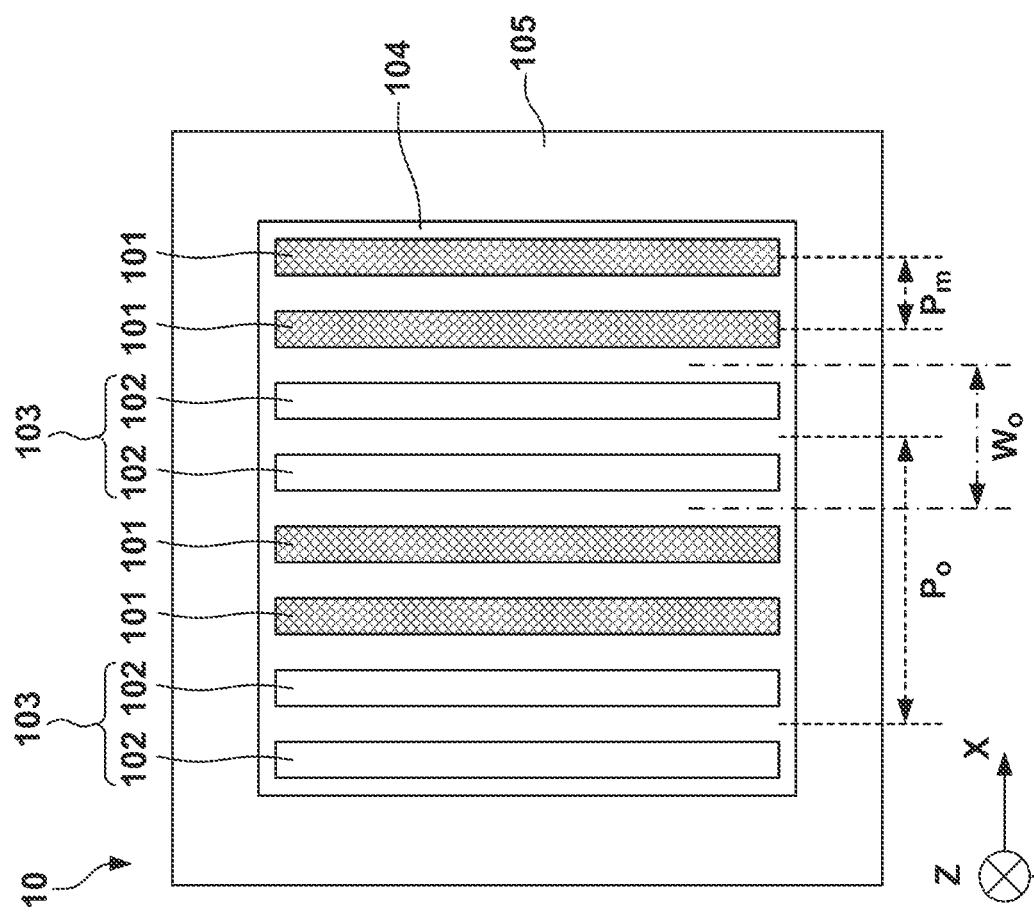
FIG. 1A
FIG. 1B

LIGHT IRRADIATION APPARATUS, OPTICAL EVALUATION APPARATUS, AND ARTICLE MANUFACTURING METHOD

BACKGROUND OF THE INVENTION

Field of the Invention

The present invention relates to a light irradiation apparatus, an optical evaluation apparatus, and an article manufacturing method.

Description of the Related Art

Japanese Patent No. 5994419 describes an inspection apparatus that images an object to be inspected while irradiating the object with light having a periodically changing luminance, calculates an amplitude value or the like of the periodic luminance change of the obtained image, and detects a defect by using the amplitude value or the like. In this inspection apparatus described in Japanese Patent No. 5994419, an illumination device for irradiating an object to be inspected with light displays stripe pattern light on a display device such as an LCD, and irradiates the object with this stipe pattern light. Alternatively, the illumination device projects stripe pattern light onto a screen by using a projector, and irradiates an object to be inspected with the stripe pattern light reflected by the screen.

An optical evaluation apparatus such as the inspection apparatus described in Japanese Patent No. 5994419 uses the illumination device including the display device such as an LCD or the illumination device including the projector and the screen, and the illumination device like this is a non-transmission-type device that does not transmit light. Therefore, to image a stripe pattern formed on an object to be inspected by using an imaging device, the illumination device must be arranged so as not to block the field of view of the imaging device, and this may increase the size of the optical evaluation apparatus. Especially when an inspection target region of an object to be inspected is a curved surface, a large illumination device is necessary to image regular reflected light from the whole inspection target region at once. This may pose the problem that the size of the optical evaluation apparatus further increases.

SUMMARY OF THE INVENTION

The present invention provides a technique advantageous in downsizing an optical evaluation apparatus.

According to one of aspects of the present invention, there is provided a light irradiation apparatus for irradiating an object with light, comprising: a plurality of line-shaped light blockers arranged at a predetermined center-to-center interval, and configured to at least partially block light; and a plurality of line-shaped light irradiators arranged to overlap some of the plurality of light blockers so as to irradiate the object with light, wherein the plurality of light irradiators are arranged to form a period not less than twice as large as the center-to-center interval of the plurality of light blockers.

Further features of the present invention will become apparent from the following description of exemplary embodiments with reference to the attached drawings.

BRIEF DESCRIPTION OF THE DRAWINGS

FIGS. 1A and 1B are views showing the arrangement of a light irradiation apparatus of an embodiment of the present invention;

DESCRIPTION OF THE EMBODIMENTS

Figure 2:
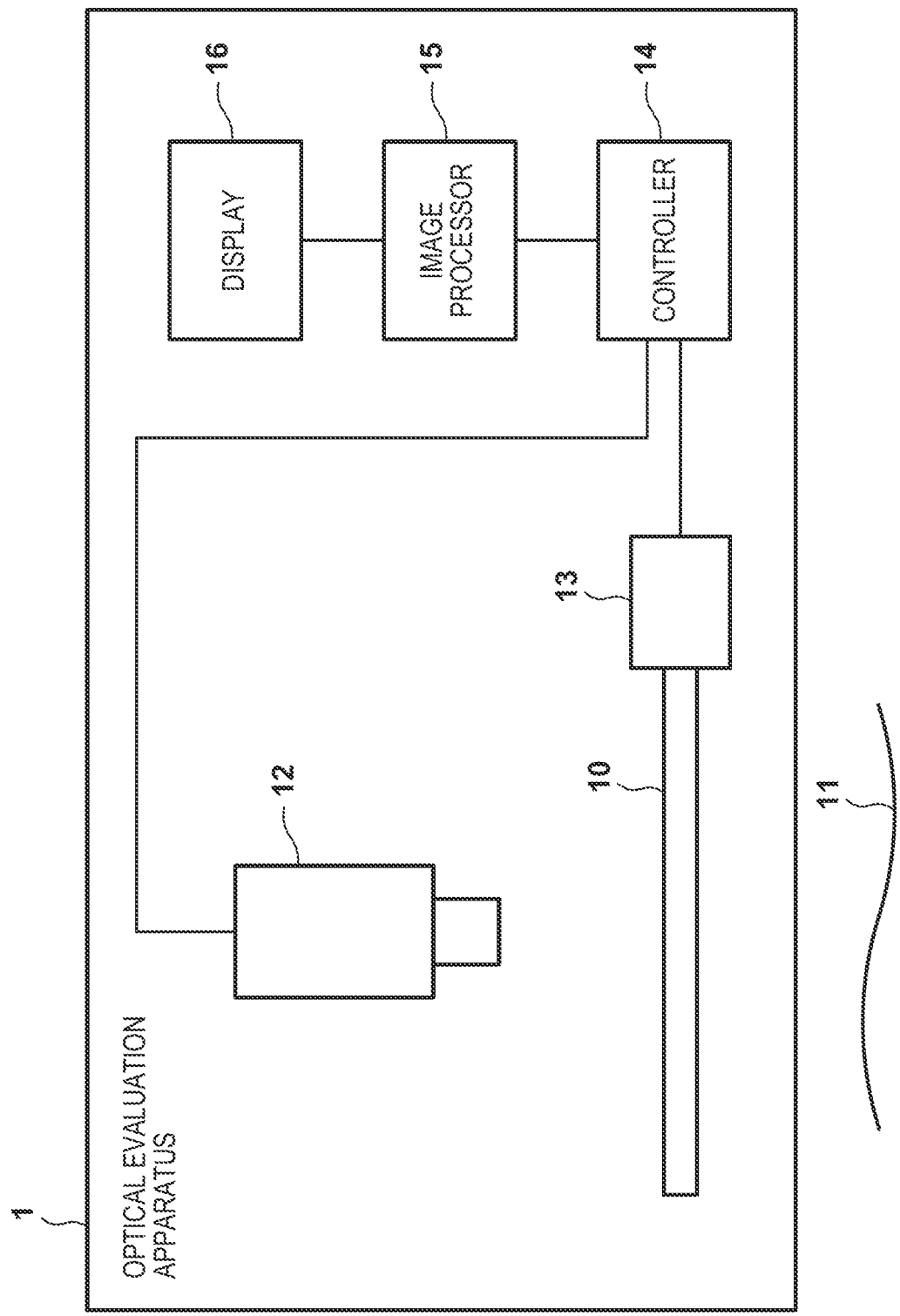
FIG. 2 is a view showing the arrangement of an optical evaluation apparatus of the embodiment of the present invention.

The present invention will be explained below by way of its exemplary embodiments with reference to the accompanying drawings.

FIGS. 1A and 1B schematically show the arrangement of a light irradiation apparatus 10 of an embodiment of the present invention. The light irradiation apparatus 10 is so configured as to irradiate an object 11 with light. FIG. 1A is a view showing the light irradiation apparatus 10 viewed from the object 11 to be irradiated with light by the light irradiation apparatus 10. FIG. 1B is a sectional view or a side view of the light irradiation apparatus 10.

The light irradiation apparatus 10 includes a plurality of light blockers 101 and a plurality of light irradiators 102. The plurality of light blockers 101 are so configured as to at least partially block light. In other words, the light transmittance of the plurality of light blockers 101 is less than 100%. Preferably, the light transmittance of the plurality of light blockers 101 is less than 10%. The plurality of light blockers 101 are a plurality of line-shaped light blockers arranged at a predetermined center-to-center interval $P_m$ in the X direction. The longitudinal direction of each light blocker 101 is a direction intersecting the X direction, for example, the Y direction. Note that the Y direction is perpendicular to the X direction. The plurality of light irradiators 102 are a plurality of line-shaped light irradiators so arranged as to overlap some of the plurality of light blockers 101, so as to irradiate the object 11 with light. A width (in the X direction) $W_{LI}$ of each light irradiator 102 is equal to or smaller than a width (in the X direction) $W_{LB}$ of each light blocker 101.

An opening 107 as a light transmitter that transmits light is formed between adjacent light blockers 101 of the plurality of light blockers 101. A plurality of openings 107 are arranged at the center-to-center interval $P_m$. An imager (to be described later) can image the object 11 through the plurality of openings 107. The light blockers 101 and the openings 107 are alternately arranged.

As described above, the center-to-center interval of the plurality of light blockers 101 in the X direction is $P_m$. This is equivalent to arranging the plurality of light blockers 101 so as to form a period $P_m$ in the X direction. The plurality of light irradiators 102 are so arranged that a period $P_o$ that is twice or more the center-to-center interval $P_m$ of the plurality of light blockers 101 is formed in the X direction. The plurality of light irradiators 102 form a plurality of periodic elements 103 so arranged as to have the period $P_o$ as a center-to-center interval. Each periodic element 103 is formed by the same number of light irradiators 102. When the number of light irradiators 102 forming each periodic element 103 is 2 or more, the center-to-center interval of the light irradiators 102 in each of the plurality of periodic elements 103 is equal to the center-to-center interval $P_m$ of the plurality of light blockers 101.

A width (in the X direction) $W_o$ of the periodic element 103 is defined as the center-to-center interval of two openings 107 adjacent to the outside of two outermost light irradiators 102 included in the periodic element 103 (two light irradiators 102 spaced most apart from each other in one periodic element 103). Letting n be the number of light irradiators 102 forming each periodic element 103, and $P_m$ be the center-to-center interval of the plurality of light blockers 101, $W_o = n \times P_m$ holds.

In the example shown in FIGS. 1A and 1B, each of the plurality of periodic elements 103 includes two light irradiators 102. Also, in the example shown in FIGS. 1A and 1B, two light blockers 101 are arranged between adjacent periodic elements 103 of the plurality of periodic elements 103. Furthermore, in the example shown in FIGS. 1A and 1B, the center-to-center interval or period $P_o$ of the plurality of periodic elements 103 is four times the center-to-center interval or period $P_m$ of the plurality of light blockers 101, and the width $W_o$ of each periodic element 103 is twice the center-to-center interval or period $P_m$ of the plurality of light blockers 101.

The light irradiation apparatus 10 further includes a light-transmitting plate member 104, and the plurality of light blockers 101 and the plurality of light irradiators 102 can be arranged on a principal surface PS of the plate member 104. The plurality of light irradiators 102 can be arranged between the principal surface PS and the light blockers 101, which are so arranged that the plurality of light irradiators 102 overlap them, of the plurality of light blockers 101. In orthographic projection (planar view) to the principal surface PS, the light irradiator 102 can be arranged so as not to extend from the light blocker 101 which the light irradiator 102 overlaps. In other words, the width of each of the plurality of light irradiators 102 can be equal to or smaller than the width of each of the plurality of light blockers 101.

As an example, the plurality of light irradiators 102 can be made of a white pigment, and the plurality of light blockers 101 can be made of a black pigment. The plurality of light irradiators 102 can be formed by applying a white pigment in the form of lines on the plate member 104, and the plurality of light blockers 102 can be formed by applying a black pigment in the form of lines. These pigments can be applied by using a well-known technique such as silk printing or inkjet printing.

The light irradiation apparatus 10 may also be manufactured by preparing the plate member 104 on which the plurality of light irradiators 102 are printed and a substrate on which the plurality of light blockers 101 are printed, and stacking the plate member 104 and the substrate such that the light irradiators 102 and the light blockers 101 overlap each other. The light irradiation apparatus 10 may also be manufactured by printing the light blockers 101 and the light irradiators 102 on another transparent plate member, and arranging the other plate member on the plate member 104. The light irradiation apparatus 10 may also be manufactured by stacking the plurality of light irradiators 102 formed by a transparent organic EL display or the like and the plurality of light blockers 101 formed by a metal plate having the plurality of line-shaped openings 107.

The plurality of light blockers 101 and the plurality of light irradiators 102 may also be formed by a method other than the method using pigments. For example, the plurality of light blockers 101 can be formed by a metal deposition film of aluminum, chromium, or the like. The light irradiator 102 may also be obtained by forming a concavo-convex structure or a stain finished structure on the principal surface PS of the plate member 104 by, for example, laser processing or blast processing.

The light irradiation apparatus 10 can further include a light source 106 for irradiating the end faces (side surfaces) of the plate member 104 with light. In one example, the plate member 104 can be held by a holding frame 105, and the light source 106 can be incorporated into the holding frame 105. The light source 106 can include, for example, a light-emitting diode (LED), a laser diode (LD), or a halogen lamp. Light emitted from the light source 106 enters the plate member 104 through the end faces of the plate member 104, and propagates inside the plate member 104 while being totally reflected. That is, the plate member 104 functions as a light-guiding plate.

A part of the light propagating inside the plate member 104 is scattered by the plurality of light irradiators 102 formed on the plate member 104. Light scattered in a direction (a positive direction of the Z-axis) opposite to the object 11 when viewed from the plate member 104 is blocked by being absorbed or reflected by the light blockers 101. This prevents the light from irradiating an imager arranged in the direction opposite to the object 11 when viewed from the plate member 104. To implement this function, the width (in the X direction) $W_{LI}$ of each light irradiator 102 is preferably equal to or smaller than the width (in the X direction) $W_{LB}$ of each light blocker 101, and more preferably smaller than $W_{LB}$. The width of each light irradiator may also be 80% (inclusive) to 95% (inclusive) of the width of each light blocker.

The object 11 is irradiated with the light scattered by the plurality of light irradiators 102 and output toward the object 11 from the plate member 104. Consequently, a light intensity distribution or an image corresponding to the arrangement of the plurality of light irradiators 102 is formed on the surface of the object 11.

When the light irradiator 102 is formed by a pigment, the thickness of the light irradiator 102 can be a few microns or more in order to irradiate the object 11 with sufficiently intense light. On the other hand, if the thickness of the light irradiator 102 is too large, the position of the light blocker 101 overlapping the light irradiator 102 becomes far from the plate member 104. This excessively increases the difference between the height of the light blocker 101 arranged on the light irradiator 102 and the height (the distance from the principal surface PS) of the light blocker 101 arranged on a portion where the light irradiator 102 is not formed. In this case, the widths of the plurality of light blockers 101 viewed from the imager become nonuniform. Therefore, the thickness of the plurality of light irradiators 102 is preferably smaller than the center-to-center interval $P_m$ of the plurality of light blockers 101.

FIG. 2 shows the arrangement of an optical evaluation apparatus 1 of the embodiment of the present invention. The optical evaluation apparatus 1 includes the light irradiation apparatus 10 as a constituent component (light irradiation device), and optically evaluates the object 11. The object 11 has, for example, a glossy surface. The object 11 can be, for example, a metal part or resin part having a polished surface. Various defects such as scratches, color loss, and dents can exist on the surface or its vicinity of the object 11.

The optical evaluation apparatus 1 can detect the defects on the surface of the object 11 by obtaining an image of a region to be inspected of the object 11, and evaluating a processed image obtained by processing the image. Also, the optical evaluation apparatus 1 can classify the object 11 into, for example, a non-defective product or a defective product based on the defect detection result. Although not shown, the optical evaluation apparatus 1 can include a conveying apparatus (for example, a conveyor, a robot, a slider, or a manual stage) (not shown) for conveying the object 11 to a predetermined position.

The optical evaluation apparatus 1 can include the light irradiation apparatus 10 for illuminating the object 11 by irradiating the object 11 with light, and an imager (camera) 12 for imaging the object 11 via the light irradiation apparatus 10. The imager 12 images the object 11 through the plurality of openings 107 between the plurality of light blockers 101. The imager 12 can include an image sensor (area sensor) in which a plurality of pixels are two-dimensionally arranged, such as a CCD image sensor or a CMOS image sensor, and an optical system that forms an image of the object 11 on the imaging plane of the image sensor. It is possible to rapidly evaluate a broad range of the object 11 by using not a line sensor but an area sensor.

The optical evaluation apparatus 1 includes a driver 13. The driver 13 moves the light irradiation apparatus 10 (the plurality of light blockers 101 and the plurality of light irradiators 102) in a direction (typically, the X direction) intersecting the longitudinal direction (Y direction) of each of the plurality of light blockers 101. In this example shown in FIG. 2, the driver 13 moves the whole light irradiation apparatus 10. However, when the plurality of light blockers 101 and the plurality of light irradiators 102 are formed on a movable member, the driver 13 may also move only the movable member.

The optical evaluation apparatus 1 can further include a controller 14. The controller 14 can be a PLD (Programmable Logic Device) such as an FPGA (Field Programmable Gate Array), an ASIC (Application Specific Integrated Circuit), a versatile or dedicated computer in which a program is installed, or a combination of all or some of them. The controller 14 operates, for example, the light irradiation apparatus 10, the imager 12, and the driver 13 in synchronism with each other. For example, the controller 14 controls the driver 13 so that the light irradiation apparatus 10 moves at a predetermined speed, and at the same time transmits a trigger signal to the imager 12 at a predetermined time interval, thereby causing the imager 12 to capture N images (N≥3). However, the configuration is not limited to this. For example, it is also possible to move the light irradiation apparatus 10 by manually operating the driver 13, and cause the imager 12 to execute imaging by a manual trigger.

The optical evaluation apparatus 1 can further include an image processor 15 and a display 16. The image processor 15 evaluates the object 11 based on a plurality of (N) images captured by the imager 12. The image processor 15 and the controller 14 may also be integrated. The image processor 15 can be, for example, a versatile or dedicated computer in which a program is installed. The images captured by the imager 12 can be transferred to the image processor 15 through a transfer path or communication path (not shown) such as a cable.

An imaging period (exposure period) during which the imager 12 performs imaging is set within a moving period during which the driver 13 moves the light irradiation apparatus 10. In other words, the imager 12 performs imaging in a state in which the driver 13 moves the light irradiation apparatus 10. The exposure period is a period during which electric charges generated by the imager 12 by photoelectric conversion are accumulated, that is, a charge accumulation period. An operation like this is advantageous to reduce frequency components (high-order frequency components) having periods shorter than the period $P_o$ of the plurality of periodic elements 103, of frequency components formed by the plurality of light blockers 101 and the plurality of periodic elements 103. The reason will be explained below with reference to FIGS. 3A to 3D.

Figure 3A:
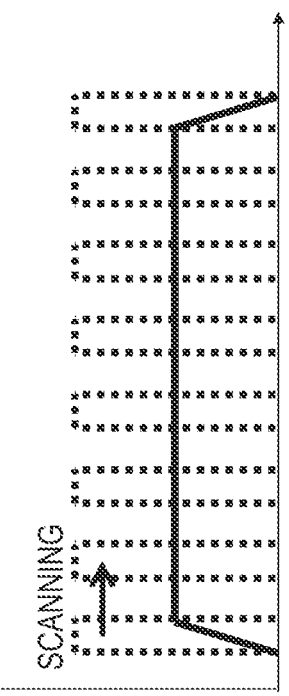
FIGS. 3A to 3D are views for explaining the effect of performing exposure by an imaging device while scanning the light irradiation apparatus.

FIG. 3A shows the transmittance distribution of the plurality of light blockers 101 observed by the imager 12 in a state in which the light irradiation apparatus 10 is at rest. The abscissa represents the X-coordinate, and the ordinate represents the transmittance (equivalent to the light amount (the time-integrated value of the luminance) during the exposure period of the imager 12). The transmittance distribution has a rectangular wave shape because the plurality of line-shaped light blockers 101 are arranged at the center-to-center interval (period) $P_m$.

Figure 3B:

FIG. 3B shows the transmittance distribution (the solid line) of the plurality of light blockers 101 observed by the imager 12 when the imager 12 continues exposure while the light irradiation apparatus 10 is scanned by $P_m$. The abscissa represents the X-coordinate, and the ordinate represents the transmittance (equivalent to the light amount (the time-integrated value of the luminance) during the exposure period of the imager 12). For comparison, FIG. 3B shows the transmittance distribution of FIG. 3A by the broken lines. Since the imager 12 continues exposure while the light irradiation apparatus 10 is scanned by $P_m$, the transmittance distribution of the plurality of light blockers 101 observed by the imager 12 is smoothed, thereby forming a trapezoidal distribution in which the upper side has an almost uniform transmittance.

Figure 3C:
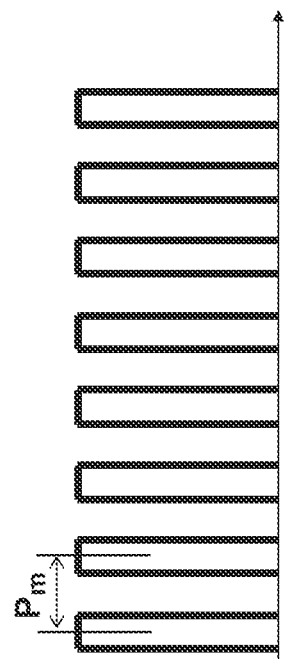

FIG. 3C shows the luminance distribution of the plurality of light irradiators 102 observed by the imager 12 in a state in which the light irradiation apparatus 10 is at rest. The abscissa represents the X-coordinate, and the ordinate represents the luminance (equivalent to the light amount (the time-integrated value of the luminance) during the exposure period of the imager 12). The luminance distribution has a rectangular wave shape having irregular intervals because the plurality of line-shaped light irradiators 102 are so arranged as to form the period $P_o$.

Figure 3D:
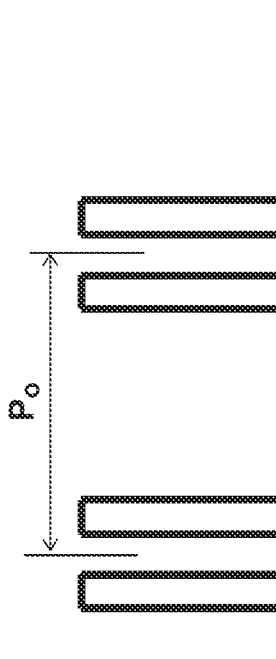

FIG. 3D shows the luminance distribution (the solid lines) of the plurality of light irradiators 102 observed by the imager 12 when the imager 12 continues exposure while the light irradiation apparatus 10 is scanned by $P_m$. The abscissa represents the X-coordinate, and the ordinate represents the luminance (equivalent to the light amount (the time-integrated value of the luminance) during the exposure period of the imager 12). For comparison, FIG. 3D shows the transmittance distribution of FIG. 3C by the broken lines. Since the imager 12 continues imaging while the light irradiation apparatus 10 is scanned by $P_m$, the luminance distribution of the plurality of light irradiators 102 observed by the imager 12 is also smoothed. However, the luminance distribution is not a single trapezoid but has a trapezoidal wave shape because the period $P_o$ formed by the plurality of light irradiators 102 (the plurality of periodic elements 103) is larger than the interval $P_m$ of the plurality of light blockers 101 (in this example, $P_o$ is four times larger than $P_m$).

As described above, when the imager 12 performs imaging while the light irradiation apparatus 10 is at rest, the transmittance distribution of the plurality of light irradiators 101 and the luminance distribution of the plurality of light irradiators 102 (the plurality of periodic elements 103), both of which are observed by the imager 12, contain the frequency components of the period $P_m$. On the other hand, when the imager 12 performs imaging while the light irradiation apparatus 10 is scanned, the frequency components of the period $P_m$, that is, high-order frequency components can be reduced. By thus reducing the high-order frequency components, the uniformity of the luminance (pixel value) in a processed image (to be explained later) can be improved.

FIGS. 3A to 3D illustrate the transmittance distribution of the plurality of light blockers 101 and the luminance distribution of the plurality of light irradiators 102 observed by the imager 12 when the imager 12 continues exposure while the light irradiation apparatus 10 is scanned by $P_m$. However, this is merely an example, and it is not essential to make the moving amount of the light irradiation apparatus 10 during the imaging period (exposure period) of the imager 12 equal to $P_m$. The moving amount of the light irradiation apparatus 10 during the imaging period (exposure period) is desirably smaller than a difference $P_o-W_o$ (that is, $P_o-(n\times P_m)$) between the center-to-center interval $P_o$ and the width $W_o$ of the plurality of periodic elements 103. This is so because if the moving amount of the light irradiation apparatus 10 during the imaging period is larger than $P_o-W_o$, a high-contrast image (waveform) cannot be obtained in the luminance distribution of the plurality of light irradiators 102 (the plurality of periodic elements 103).

To further reduce the high-order frequency components, it is advantageous that the imager 12 has a function (overlap function) capable of executing imaging (exposure) and image transfer in parallel. The imager 12 having the overlap function can perform imaging even during a time required to transfer an image, so a higher smoothing effect can be obtained.

When the number of the light irradiators 102 forming each of the plurality of periodic elements 103 is 2 or more, the light irradiators 102 forming each periodic element 103 are desirably arranged at the period $P_m$. That is, each periodic element 103 is desirably formed by n light irradiators 102 continuously arranged at the period $P_m$. This is to avoid the generation of undesirable frequency components (frequency components other than the period $P_o$) in the luminance distribution of the light irradiator 102 when the imager 12 continues exposure while the light irradiation apparatus 10 is scanned. The undesirable frequency components may exert a bad influence on a processed image to be explained below.

Also, the ratio ($W_o/P_o$) (a duty ratio) of the width $W_o$ (that is, $n\times P_m$) to the period $P_o$ of the plurality of periodic elements 103 is preferably ¼ (inclusive) to ¾ (inclusive). That is, it is preferable to satisfy the condition that $\frac{1}{4} \leq (n \times P_m)/P_o \leq \frac{3}{4}$. This is so because if this condition is met, the undesirable frequency components (frequency components other than the period $P_o$) generated in the luminance distribution of the plurality of light irradiators 102 observed by the imager 12 are sufficiently small. In addition, from the same point of view, the duty ratio ($W_{LB}/P_m$) of the plurality of light blockers 101 and the duty ratio ($W_{LI}/P_m$) of the plurality of light irradiators 102 are preferably 40% or less or 60% or more. Note that if the duty ratio is increased, the resolution may decrease because the light blockers 101 block a part of the pupil of the optical system of the imager 12. When this is taken into consideration, the duty ratio ($W_{LB}/P_m$) of the plurality of light blockers 101 and the duty ratio ($W_{LI}/P_m$) of the plurality of light irradiators 102 are preferably 40% or less.

Figure 4:
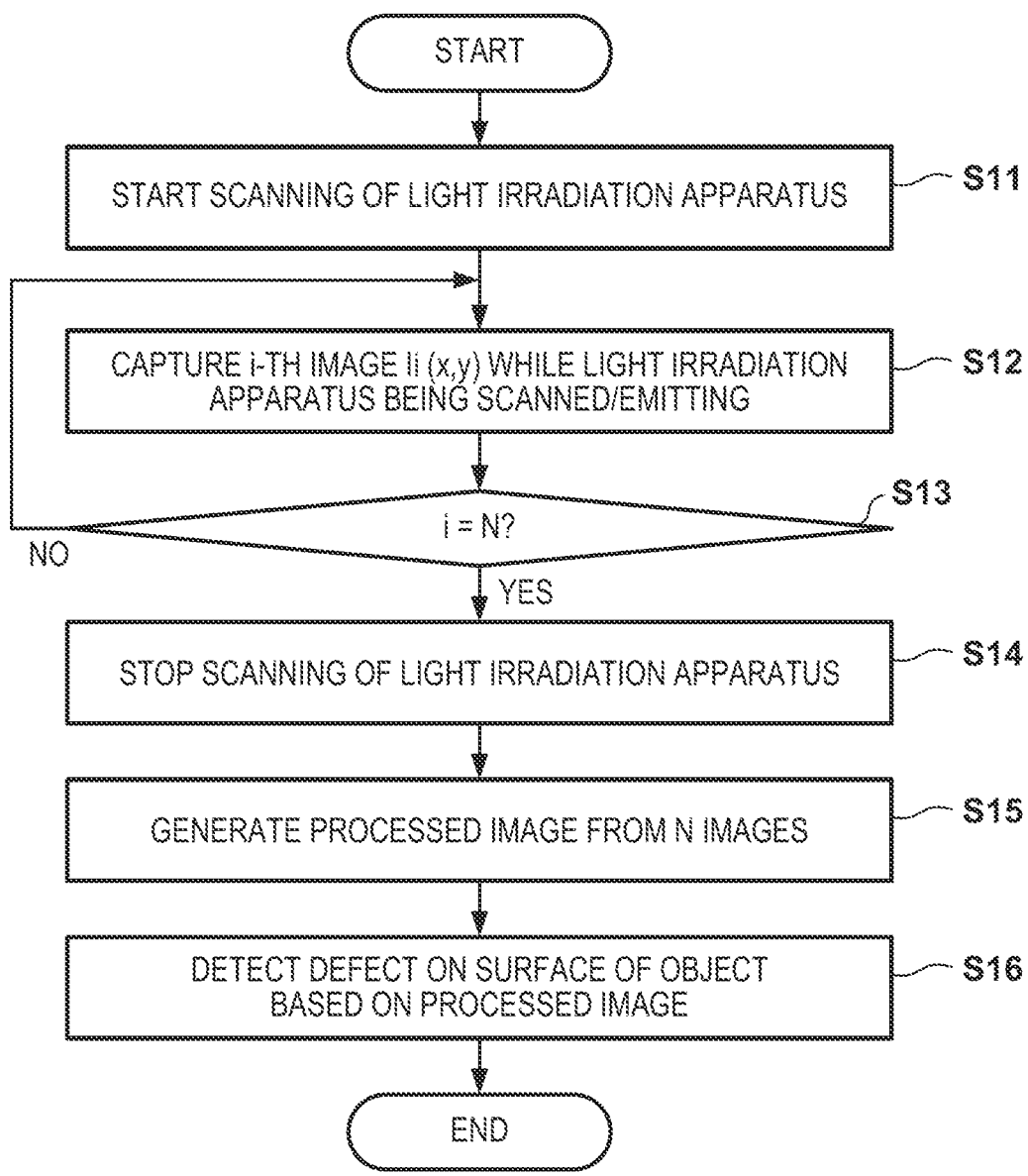
FIG. 4 is a flowchart showing the operation of the optical evaluation apparatus of the embodiment of the present invention.

FIG. 4 shows the procedure of an inspection method to be executed by the optical evaluation apparatus 1. The controller 14 controls this inspection method. An example of inspecting a defect on the surface of the object 11 will be explained with reference to FIG. 4. First, in step S11, the controller 14 causes the driver 13 to start scanning (moving) the light irradiation apparatus 10. In step S12, the controller 14 causes the light irradiation apparatus 10 to emit light (to irradiate the object 11 with light) while the light irradiation apparatus 10 is scanned by the driver 13, and causes the imager 12 to perform imaging. Consequently, the imager 12 captures an ith image $I_i(x, y)$. This operation is repeated until i=1 to N, and as a consequence a total of N (N≥3) images are captured. (x, y) indicates the position (coordinate values) of a pixel in the image.

In step S14, the controller 14 causes the driver 13 to stop scanning the light irradiation apparatus 10. In step S15, the controller 14 causes the image processor 15 to process the N images obtained by repeating step S12, and generate a processed image to be used to detect a defect. In step S16, the controller 14 detects a defect on the surface of the object 11 based on the processed image obtained in step S15.

An example of the processed image is an amplitude image of a frequency component having a phase that shifts by $2\pi \Delta X_i/P_o$ radian. $\Delta X_i$ (i=1, 2, ..., N) is the position of the light irradiation apparatus 10 with respect to a reference position when capturing the ith image. When the position of the light irradiation apparatus 10 is $\Delta X_i$, the phase of the plurality of periodic elements 103 is represented by $2\pi \Delta X_i/P_o$ radian. When the light irradiation apparatus 10 emits light with a predetermined light amount while being scanned and the imager 12 performs imaging (exposure), $\Delta X_i$ is the average position of the light irradiation apparatus 10 during the exposure period. $\Delta X_i$ can be set at an arbitrary value as long as the value is known. However, since phases different from each other by an integral multiple of $2\pi$ have the same value, imaging can be performed in the position of the light irradiation apparatus 10 where $\Delta X_n \neq \Delta X_m + nP_o$.

When the N images are captured under the condition that the positions of the light irradiation apparatus 10 have an interval of $P_o/N$, $\Delta X_i$ is represented by equation (1) (where the position at which the first image is captured is the reference position):

$$\Delta X_i = (P_o/N) \times (i-1) \tag{1}$$

In this case, an amplitude image $A(x, y)$ can be calculated by equation (2):

$$A(x, y) = \sqrt{I_{sin}^2(x, y) + I_{cos}^2(x, y)} \tag{2}$$

$$I_{sin}(x, y) = \sum_{n=0}^{N-1} I_{n+1}(x, y) \sin\left(\frac{2\pi n}{N}\right)$$

$$I_{cos}(x, y) = \sum_{n=0}^{N-1} I_{n+1}(x, y) \cos\left(\frac{2\pi n}{N}\right)$$

When the light irradiation apparatus 10 is moved, images of the plurality of light irradiators 102 reflected on the surface of the glossy object 11 move, so the luminance of incident light changes in each pixel of the imager 12. In a portion having normal glossy on the surface of the object 11, the luminance largely changes when the light irradiation apparatus 10 moves, so the amplitude value of the luminance increases. On the other hand, a portion having scattering defects such as a scratch and surface roughness generates scattered light in addition to minor-surface reflected light. When light is scattered on the surface of the object 11, the images of the plurality of light irradiators 102 reflected on the surface blur, so a contrast difference of the intensity decreases, and the amplitude value also decreases. For example, on a perfectly diffusing surface, the scattering angle distribution of light does not depend on the angle of incident light any longer. Therefore, even when the plurality of light irradiators 102 project a trapezoidal-wave-shaped pattern onto the object 11, the luminance is always constant regardless of the position of the light irradiation apparatus 10, so the amplitude becomes zero. In an amplitude image, therefore, a normal portion is visualized to be bright, and a defective portion is visualized to be dark. This makes it possible to evaluate the degree of scattering as the surface property in the amplitude image, and obtain information of scattering defects such as a scratch and surface roughness.

Another example of the processed image is a phase image. A phase image $\theta(x, y)$ can be calculated by equation (3):

$$\theta(x, y) = \tan^{-1}\left(\frac{I_{sin}(x, y)}{I_{cos}(x, y)}\right) \tag{3}$$

In equation (3), the phase is calculated by a value from $-\pi$ to $\pi$. If the phase changes more than that, therefore, discontinuous phase skip occurs in a phase image. If this is a case, phase connection (phase unwrap) is necessary.

In the phase image, the surface inclination of the object 11 can be evaluated as the surface property. In the phase image, therefore, it is possible to obtain information of defects caused by gentle shape changes such as a dent, a face tangle error, and a surface depression in the phase image.

Various algorithms have been proposed for phase connection (phase unwrap), but phase connection sometimes fails if the image noise is large. As a method of avoiding phase connection, a phase difference (equivalent to differentiation of the phase) can be calculated instead of the phase. Phase differences $\Delta\theta_x(x, y)$ and $\Delta\theta_y(x, y)$ can be calculated by equation (4):

$$\Delta\theta_x(x, y) = \tan^{-1}\left(\frac{I_{cos}(x, y)I_{cos}(x-1, y) + I_{sin}(x, y)I_{sin}(x-1, y)}{I_{sin}(x, y)I_{cos}(x-1, y) - I_{cos}(x, y)I_{sin}(x-1, y)}\right) \tag{4}$$

$$\Delta\theta_y(x, y) = \tan^{-1}\left(\frac{I_{cos}(x, y)I_{cos}(x, y-1) + I_{sin}(x, y)I_{sin}(x, y-1)}{I_{sin}(x, y)I_{cos}(x, y-1) - I_{cos}(x, y)I_{sin}(x, y-1)}\right)$$

Still another example of the processed image is an average image. An average image $I_{ave}(x, y)$ can be calculated by equation (5):

$$I_{ave}(x, y) = \frac{1}{N}\sum_{n=1}^{N} I_n(x, y) \tag{5}$$

In the average image, the reflectance distribution can be evaluated as the surface property. In the average image, therefore, it is possible to obtain information of defects having reflectance different from that of a normal portion, such as a color loss, a stain, and an absorptive foreign body.

As described above, an optically evaluable surface property changes in accordance with the processed image. Since, therefore, a defect to be visualized also changes from one processed image to another, various defects can be visualized in processed images by combining the processed images.

FIGS. 3B and 3D depict the transmittance distribution of the plurality of light blockers 101 and the luminance distribution of the plurality of light irradiators 102 observed by the imager 12 when the imager 12 continues imaging while scanning the light irradiation apparatus 10. However, the positions of the plurality of light blockers 101 and the plurality of light irradiators 102 are not independent of each other. Strictly speaking, therefore, an image obtained by performing exposure while scanning the light irradiation apparatus 10 is not the product of the transmittance distribution of the plurality of light irradiators 102 shown in FIG. 3B and the luminance distribution of the plurality of light irradiators 102 shown in FIG. 3D. As a result, the image contains high-order frequency components. Even in a normal region of the object 11, therefore, periodic intensity nonuniformity can occur in the average image, the amplitude image, and the phase image. If the intensity (pixel value) of these images has nonuniformity, the accuracy of detection of defects on the surface of the object 11 may decrease.

Figure 5:
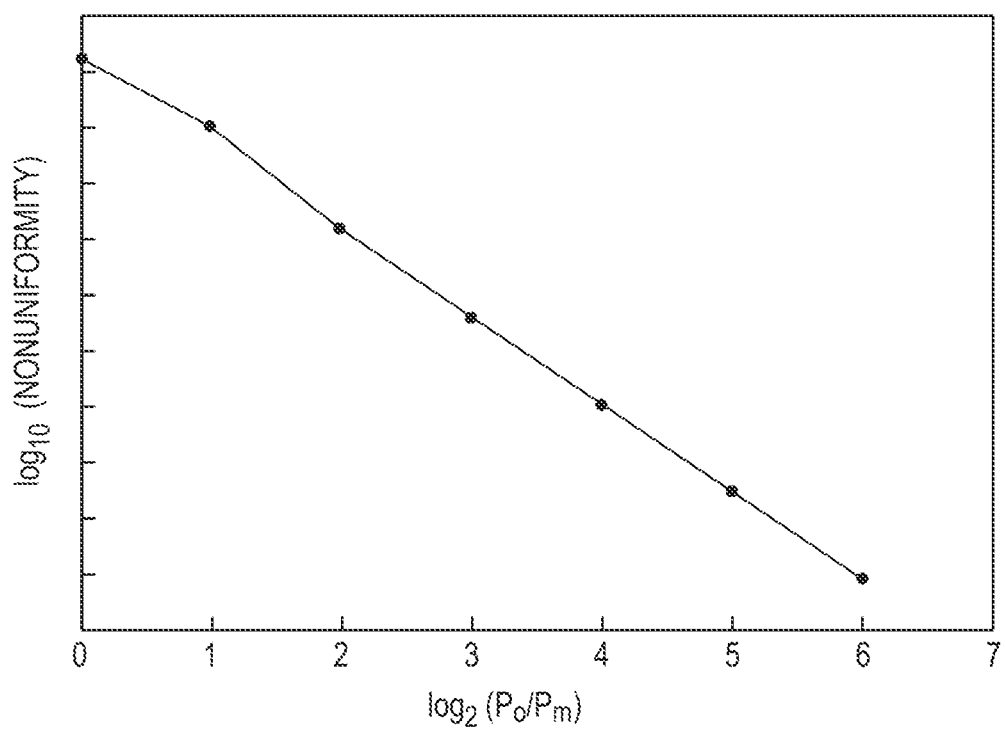
FIG. 5 is a graph showing the relationship between a ratio ($P_o/P_m$) of a center-to-center interval $P_o$ of a plurality of periodic elements to a center-to-center interval $P_m$ of a plurality of light blockers and the nonuniformity of the intensity of an image.

FIG. 5 shows the calculation result of the nonuniformity of the intensity (pixel value) generated on an image, with respect to the ratio ($P_o/P_m$) of the center-to-center interval $P_o$ of the plurality of periodic elements 103 to the center-to-center interval $P_m$ of the plurality of light blockers 101. When $P_o/P_m$ increases in the double-logarithmic plot, the nonuniformity of the intensity linearly decreases. Accordingly, when the light irradiators 102 are formed in all the light blockers 101 ($P_o=P_m$), a large intensity nonuniformity occurs on the image. In addition, $P_o/P_m$ is preferably increased as much as possible in order to improve the image uniformity. Therefore, the center-to-center interval $P_o$ of the plurality of periodic elements 103 is preferably twice or more, and more preferably 8 times or more the center-to-center interval $P_m$ of the plurality of light blockers 101.

On the other hand, if the center-to-center interval $P_m$ of the plurality of light blockers 101 is excessively decreased, the diffraction of light blurs an image, and the resolution decreases. Letting $\lambda$ be the wave length of light to be emitted by the light irradiation apparatus 10, an angle $\theta$ of 1st-order diffracted light obtained by the light blocker 101 is represented by equation (6):

$$\theta = \sin^{-1}\left(\frac{\lambda}{P_m}\right) \tag{6}$$

Letting D be the distance between the surface on which the plurality of light blockers 101 are arranged and the surface of the object 11, the 1st-order diffracted light generates a blur of $2D\tan\theta$ on the surface of the object 11. Letting B be an allowable blur amount, the center-to-center interval $P_m$ of the plurality of light blockers 101 must be larger than ($2D\lambda/B$).

On the other hand, if $P_o/P_m$ is large and the value of $P_m$ is also large, the value of the center-to-center interval $P_o$ of the plurality of periodic elements 103 also increases. In this case, the distance at which the driver 13 moves the light irradiation apparatus 10 increases, and this may increase the size of the optical evaluation apparatus 1. Also, if the center-to-center interval $P_o$ of the plurality of periodic elements 103 is large, a scattering defect having a low scattering degree (a high directivity) in the amplitude image becomes difficult to detect in the phase image. Even when $P_o/P_m$ is excessively increased, the intensity nonuniformity of an image is buried in noise and the like and does not improve. Accordingly, the center-to-center interval $P_o$ of the plurality of periodic elements 103 is preferably 256 times or less the center-to-center interval $P_m$ of the plurality of light blockers 101.

EXAMPLE 1

In the optical evaluation apparatus 1 of Example 1, the center-to-center interval $P_m$ of the plurality of light blockers 101 is 0.5 mm, the center-to-center interval $P_o$ of the plurality of periodic elements 103 is 8 mm, and the width $W_o$ of each periodic element 103 is 4 mm. Accordingly, $P_m/W_o$ is 16, and the duty ratio ($W_o/P_o$) of the periodic element 103 is 50%. Also, the width $W_{LB}$ of the light blocker 101 is 0.2 mm (the duty ratio ($W_{LB}/P_m$) is 40%), and the width $W_{LI}$ of the light irradiator 102 is 0.1 mm (the duty ratio ($W_{LI}/P_m$) is 20%).

The optical evaluation apparatus 1 captures 16 images in positions where the plurality of periodic elements 103 have different phases. The driver 13 scans the light irradiation apparatus 10 at a velocity of 10 mm/sec, and the imager 12 performs imaging in an exposure period of 50 ms and at an imaging interval of 50 ms. Under the conditions, the moving amount of the light irradiation apparatus 10 during the exposure period of each image is 0.5 mm. In addition, when excluding times required to accelerate and decelerate the light irradiation apparatus 10 by the driver 13, the operation for capturing the 16 images completes in 0.8 sec.

EXAMPLE 2

In the optical evaluation apparatus 1 of Example 2, the center-to-center interval $P_m$ of the plurality of light blockers 101 is 1 mm, the center-to-center interval $P_o$ of the plurality of periodic elements 103 is 12 mm, and the width $W_o$ of each periodic element 103 is 6 mm. Accordingly, $P_m/W_o$ is 12, and the duty ratio ($W_o/P_o$) of the periodic element 103 is 50%. Also, the width $W_{LB}$ of the light blocker 101 is 0.3 mm (the duty ratio ($W_{LB}/P_m$) is 30%), and the width $W_{LI}$ of the light irradiator 102 is 0.2 mm (the duty ratio ($W_{LI}/P_m$) is 20%).

The optical evaluation apparatus 1 captures nine images in positions where the plurality of periodic elements 103 have different phases. The driver 13 scans the light irradiation apparatus 10 at a velocity of 22.2 mm/sec, and the imager 12 performs imaging in an exposure period of 60 ms and at an imaging interval of 50 ms. Under the conditions, the moving amount of the light irradiation apparatus 10 during the exposure period of each image is 1.33 mm. In addition, when excluding times required to accelerate and decelerate the light irradiation apparatus 10 by the driver 13, the operation for capturing the nine images completes in 0.54 sec.

According to the light irradiation apparatus 10 of this embodiment, the imager 12 can image the object 11 via the plurality of openings 107 of the light irradiation apparatus 10. Therefore, it is possible to coaxially arrange the light irradiation apparatus 10 and the imager 12, in other words, it is possible to arrange the light irradiation apparatus 10 between the object 11 and the imager 12. Accordingly, the light irradiation apparatus 10 can be arranged near the object 11. Even when using a small-sized light irradiation apparatus 10, therefore, regular reflected light to the imager 12 can be obtained from a broad range of the surface of the object 11. Consequently, the optical evaluation apparatus 1 using the light irradiation apparatus 10 of this embodiment can optically evaluate a broad range of the surface of the object 11 at once. Especially when the surface of an object is a curved surface and a non-transmitting-type light irradiation apparatus is arranged far from the object, a huge light irradiation apparatus is necessary to obtain regular reflected light to an imager from a broad range of the object. Therefore, the light irradiation apparatus 10 according to this embodiment is particularly effective when the surface of an object is a curved surface. Also, the light irradiation apparatus 10 of this embodiment can reduce the nonuniformity of the intensity on an image, which exerts a bad influence on the evaluation of the surface of the object 11, by making the center-to-center interval $P_o$ of the plurality of periodic elements 103 twice or more the center-to-center interval $P_m$ of the light blockers 101.

In addition, the optical evaluation apparatus 1 using the light irradiation apparatus 10 of this embodiment can be used in optical evaluation (optical inspection) that is performed as one step of an article manufacturing method (processing method). For example, the surface of a processed work (an object to be processed) is optically evaluated by using the optical evaluation apparatus 1 of this embodiment. If the evaluation result is better than a threshold, the work is conveyed to (an apparatus for performing) a subsequent step. If the result is worse than the threshold, the work is conveyed to (an apparatus for performing) a reprocessing step. That is, the optical evaluation apparatus 1 of this embodiment is applicable to an article manufacturing method that performs different processes (conveyance to a subsequent-step apparatus and conveyance to a reprocessing apparatus) in accordance with the optical evaluation result. In addition, when using the optical evaluation apparatus 1 of this embodiment, an optical evaluation step (an optical evaluation apparatus) can be incorporated without requiring any large space inside a manufacturing apparatus (processing apparatus).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-126888, filed Jul. 3, 2018, which is hereby incorporated by reference herein in its entirety.

What is claimed is:

1. A light irradiation apparatus for irradiating an object with light, comprising:
   a plurality of line-shaped light blockers arranged at a predetermined center-to-center interval, and configured to at least partially block light; and
   a plurality of line-shaped light irradiators arranged to overlap some of the plurality of light blockers so as to irradiate the object with light,
   wherein the plurality of light irradiators are arranged to form a period not less than twice as large as the center-to-center interval of the plurality of light blockers.

2. The apparatus according to claim 1, wherein the plurality of light irradiators are arranged to form a plurality of periodic elements arranged at the period as a center-to-center interval thereof, and each of the plurality of periodic elements includes the same number of light irradiators.

3. The apparatus according to claim 2, wherein the number is not less than 2, and a center-to-center interval of the light irradiators in each of the plurality of periodic elements is equal to the center-to-center interval of the plurality of light blockers.

4. The apparatus according to claim 2, wherein letting n be the number, $P_m$ be the center-to-center interval of the plurality of light blockers, and $P_o$ be the period, $$\tfrac{1}{4} \leq (n \times P_m)/P_o \leq \tfrac{3}{4}$$

is satisfied.

5. The apparatus according to claim 1, wherein a width of each of the plurality of light irradiators is not more than a width of each of the plurality of light blockers.

6. The apparatus according to claim 1, wherein a longitudinal direction of each of the plurality of light blockers and a direction in which the plurality of light blockers are arranged are perpendicular to each other.

7. The apparatus according to claim 1, further comprising a light-transmitting plate member,
   wherein the plurality of light blockers and the plurality of light irradiators are arranged on a principal surface of the plate member.

8. The apparatus according to claim 7, wherein the plurality of light irradiators are arranged between the principal surface and light blockers, of the plurality of light blockers, which are arranged such that the plurality of light irradiators overlap the light blockers.

9. The apparatus according to claim 8, further comprising a light source configured to irradiate an end face of the plate member with light.

10. The apparatus according to claim 1, wherein a thickness of the plurality of light irradiators is smaller than the center-to-center interval of the plurality of light blockers.

11. An optical evaluation apparatus comprising:
   a light irradiation apparatus as defined in claim 1;
   an imager configured to image the object irradiated with light by the light irradiation apparatus, through an opening between the plurality of light blockers;
   a driver configured to move the plurality of light blockers and the plurality of light irradiators in a direction intersecting a longitudinal direction of each of the plurality of light blockers; and
   an image processor configured to evaluate the object based on a plurality of images captured by the imager.

12. The apparatus according to claim 11, wherein the imager performs imaging in a state in which the driver is moving the plurality of light blockers and the plurality of light irradiators.

13. The apparatus according to claim 12, wherein
   the plurality of light irradiators are arranged to form a plurality of periodic elements arranged at the period as a center-to-center interval, and each of the plurality of periodic elements includes the same number of light irradiators, and
   letting n be the number, $P_m$ be the center-to-center interval of the plurality of light blockers, and $P_o$ be the period,
   a distance at which the driver moves the plurality of light blockers and the plurality of light irradiators during an exposure period of the imager is smaller than $P_o-(n \times P_m)$.

14. An article manufacturing method comprising:
   evaluating an article; and
   performing processing corresponding to a result of the evaluation on the article,
   wherein the evaluating of the article is performed by using an optical evaluation apparatus comprising:
   a light irradiation apparatus configured to irradiate an object with light, the light irradiation apparatus including a plurality of line-shaped light blockers arranged at a predetermined center-to-center interval, and configured to at least partially block light, and a plurality of line-shaped light irradiators arranged to overlap some of the plurality of light blockers so as to irradiate the object with light, the plurality of light irradiators being arranged to form a period not less than twice as large as the center-to-center interval of the plurality of light blockers;
   an imager configured to image the object irradiated with light by the light irradiation apparatus, through an opening between the plurality of light blockers;
   a driver configured to move the plurality of light blockers and the plurality of light irradiators in a direction intersecting a longitudinal direction of each of the plurality of light blockers; and
   an image processor configured to evaluate the object based on a plurality of images captured by the imager.

* * * * *